United States Patent
Krejci et al.

(10) Patent No.: US 12,168,976 B2
(45) Date of Patent: Dec. 17, 2024

(54) NEUTRALIZER FOR AN ION THRUSTER OF A SPACECRAFT

(71) Applicant: ENPULSION GmbH, Wiener Neustadt (AT)

(72) Inventors: David Krejci, Wartberg an der Krems (AT); Quirin Koch, Vienna (AT)

(73) Assignee: ENPULSION GmbH, Wien-Flughafen (AT)

( * ) Notice: Subject to any disclaimer, the term of this patent is extended or adjusted under 35 U.S.C. 154(b) by 16 days.

(21) Appl. No.: 17/909,649

(22) PCT Filed: Mar. 2, 2021

(86) PCT No.: PCT/EP2021/055108
§ 371 (c)(1),
(2) Date: Sep. 6, 2022

(87) PCT Pub. No.: WO2021/204463
PCT Pub. Date: Oct. 14, 2021

(65) Prior Publication Data
US 2023/0106067 A1 Apr. 6, 2023

(30) Foreign Application Priority Data

Apr. 7, 2020 (EP) .................... 20168477

(51) Int. Cl.
*F03H 1/00* (2006.01)
*B64G 1/40* (2006.01)

(52) U.S. Cl.
CPC .......... *F03H 1/0025* (2013.01); *B64G 1/405* (2013.01); *F03H 1/005* (2013.01)

(58) Field of Classification Search
None
See application file for complete search history.

(56) References Cited

U.S. PATENT DOCUMENTS

| 6,304,040 B1 | 10/2001 | Cardwell, Jr. et al. |
| 6,449,941 B1 | 9/2002 | Warboys et al. |
| 2018/0023550 A1 | 1/2018 | Tsay et al. |
| 2018/0269024 A1* | 9/2018 | Nguyen ............ H01J 37/32596 |

FOREIGN PATENT DOCUMENTS

EP   0468706 A2   1/1992

OTHER PUBLICATIONS

PCT International Search Report on International Application No. PCT/EP2021/055108 dated May 27, 2021.
European Patent Office Search Report on Application No. 20168477.6-1203, dated Sep. 14, 2020.
International Preliminary Report on Patentability dated Oct. 6, 2022, in corresponding International Application No. PCT/EP2021/055108.

* cited by examiner

*Primary Examiner* — Arun Goyal
*Assistant Examiner* — William L Breazeal
(74) *Attorney, Agent, or Firm* — Hoffmann & Baron, LLP

(57) ABSTRACT

A Neutralizer for an ion thruster of a spacecraft comprises a cathode for emission of electrons, a support with an opening inside which the cathode is supported in a radially spaced manner, and an electrically conductive shielding which surrounds said opening and is electrically insulated from the support, wherein a ring is mounted between the shielding and the cathode and is electrically insulated from the shielding and radially spaced from the cathode.

20 Claims, 2 Drawing Sheets

NEUTRALIZER FOR AN ION THRUSTER OF A SPACECRAFT

CROSS-REFERENCE TO RELATED APPLICATIONS

This application is a National Phase application of International Application No. PCT/EP2021/055108 filed Mar. 2, 2021 which claims priority to the European Patent Application No. 20 168 477.6 filed Apr. 7, 2020, the disclosures of which are incorporated herein by reference.

TECHNICAL FIELD

The present disclosed subject matter relates to a neutralizer for an ion thruster of a spacecraft, comprising a cathode for emission of electrons, a support with an opening inside which the cathode is supported in a radially spaced manner, and an electrically conductive shielding which surrounds said opening and is electrically insulated from the support.

BACKGROUND

Ion thrusters are used for propelling spacecraft which includes controlling the orientation or rotation of spacecraft. A spacecraft may be equipped with one or more ion thrusters. Each ion thruster may have one or more ion emitters. For generating thrust, ions are both extracted from each ion emitter and accelerated with the aid of a strong electrical field created by an extractor of the ion thruster. The emission of—in most cases positively charged—ions has to be compensated to prevent an increasing electrostatic charging of the spacecraft. Otherwise, emitted ions would return to the charged spacecraft and uncontrollably void the thrust generated by the ion thruster.

For compensating the emission of ions, it is known in the art to equip ion thrusters with one or more electron sources ("neutralizers") which emit a respective quantity of (negatively charged) electrons by means of a cathode, e.g., a thermionic cathode. Each neutralizer is typically arranged in close proximity to an ion emitter of the ion thruster. For repelling the electrons emitted by the cathode from the ion thruster, the cathode of the neutralizer is generally negatively charged with respect to the ion thruster. However, the emitted electrons have to overcome the strong electrical field of the extractor of the proximate ion emitter. This is facilitated by said shielding which surrounds the opening of the support and is usually connected to ground, i.e., electrical "zero potential" of the ion thruster while a negative voltage of several hundred to several thousand volts is applied to the extractor. In combination, the negatively charged cathode, the grounded shielding and the positive space charge originating from the emitted ions cause a large number of electrons which are emitted by the cathode to overcome the extractor's electrical field and to emerge from the neutralizer such that they contribute to the compensation of ions emitted by the ion thruster.

BRIEF SUMMARY

It is an object of the present disclosed subject matter to increase the efficiency of a neutralizer for an ion thruster of a spacecraft.

This object is achieved with a neutralizer specified at the outset, which further comprises a ring that is mounted between the shielding and the cathode and is electrically insulated from the shielding and radially spaced from the cathode.

The disclosed subject matter is based on the finding that, in a conventional neutralizer, still a considerable portion of the electrons emitted by the cathode is attracted and continuously absorbed by the (grounded) shielding. These electrons, while consuming energy for emission by the cathode, do not emerge from the neutralizer and, hence, do not contribute to the compensation of ion emission by the ion thruster; they are lost. The ring of the disclosed subject matter may be held at or adopts an electrostatic charging level which differs from the one of the shielding. The ring is a simple and effective means to create an electrical field by which the number of electrons absorbed by the shielding is—at least—substantially reduced as the electrical field effected by the electrostatic charging level of the ring counteracts the electrostatic attraction of electrons by the grounded shielding. This considerably increases the efficiency of the neutralizer in emitting electrons as a continued absorption of electrons by the shielding is—at least largely—prohibited.

In a beneficial embodiment, the ring is electrically conductive, e.g., made of metal, and electrically insulated from the shielding. In this case, the ring may be electrically pre-charged to and controlled to remain at a predetermined electrostatic charging level by a respective controlled voltage supply such that the neutralizer becomes effective immediately after activation; alternatively, the ring is passive such that the voltage supply is saved and the ring is gradually (pre-) charged by electrons emitted by the cathode and absorbed by the ring; thereby, the effect of the ring counteracting the attraction of electrons by the shielding gradually increases.

In a particularly beneficial alternative of the neutralizer, the ring is ceramic. The ceramic ring is dielectric, such that a sufficient electrical field is quickly reached by electrons attaching to the inner face of the ring without charging the whole ring and without any voltage supply and control. Thereby, the effect of the ring counteracting the attraction of electrons by the shielding is quickly achieved. Moreover, ceramic is more durable than other dielectric materials, particularly with respect to the harsh space environment.

It shall be noted that, unlike an electron which is absorbed by the shielding and, thus, is lost, an electron which attaches to (or is absorbed by) the ring does not reduce the efficiency of the neutralizer as it contributes to the electrostatic charging of the ring (or its inner face); it is not lost.

In a favourable variant, the ceramic ring is formed as an inner layer on the shielding. Thereby, the ring and the shielding form a single part having an electrically conductive outer layer and a ceramic inner layer. Such a double-layer part can easily be handled and mounted.

In a beneficial embodiment, the ring and the support are a single, unitary part. In this embodiment, the total number of parts to be manipulated and assembled is reduced which eases manufacturing and reduces the complexity of the neutralizer.

It is advantageous when the support, the shielding and the ring are symmetrical about a common central axis, and when the cathode is supported to be in the centre of said opening. This facilitates the manufacturing of the neutralizer, its application to an ion thruster and an even distribution of electrons emitted by the cathode. The term "symmetrical" in this context includes circular symmetry and also, more general, rotational symmetry.

Alternatively, the support and the ring are symmetrical about a common central axis and the shielding has an oblique top face such that, in axial direction, the shielding extends further from the support on one side of said opening than on the opposite side thereof. Such an asymmetric shielding allows for compensating the asymmetry in the strong electrical field of the extractor of the proximate ion emitter which is closer to one side of the neutralizer's opening than to the opposite side of the opening. Moreover, the cathode may be supported to be in the centre of the opening or to be eccentric.

It is favourable that the ring has an inner face that, in axial direction, widens with increasing distance from the support. Such a widening inner face of the ring forms an electrical field that facilitates the emission of the electrons from the neutralizer.

In an advantageous embodiment, the ring, in axial direction, extends further from the support than the shielding. Thereby, an absorption of electrons by the shielding is even more effectively and reliably prohibited.

Alternatively, the shielding, in axial direction, extends further from the support than the ring. Thereby, the electrical field gradient can be shaped to continuously decrease with increasing distance from the cathode.

Similar to the ring, the support may be electrically conductive and, optionally, pre-charged to a predetermined charging level for supporting the cathode in repelling the emitted electrons and directing the electrons away from the neutralizer towards the positive space charge originating from the emitted ions. In a favourable alternative, however, the support is ceramic. Thereby, the support reaches said electrostatic charging level quickly and without any voltage supply or control due to electrons emitted by the cathode and attaching to the support.

For supporting the cathode in the opening inside the support it is beneficial when the cathode has supply wires via which it is mounted to the support. Additional clamps or other mountings are not required in this case. The overall structure of the neutralizer is, thus, particularly simple.

BRIEF DESCRIPTION OF THE DRAWINGS

The disclosed subject matter shall now be explained in more detail below on the basis of exemplary embodiments thereof with reference to the accompanying drawings, in which.

DETAILED DESCRIPTION

Figure 1:
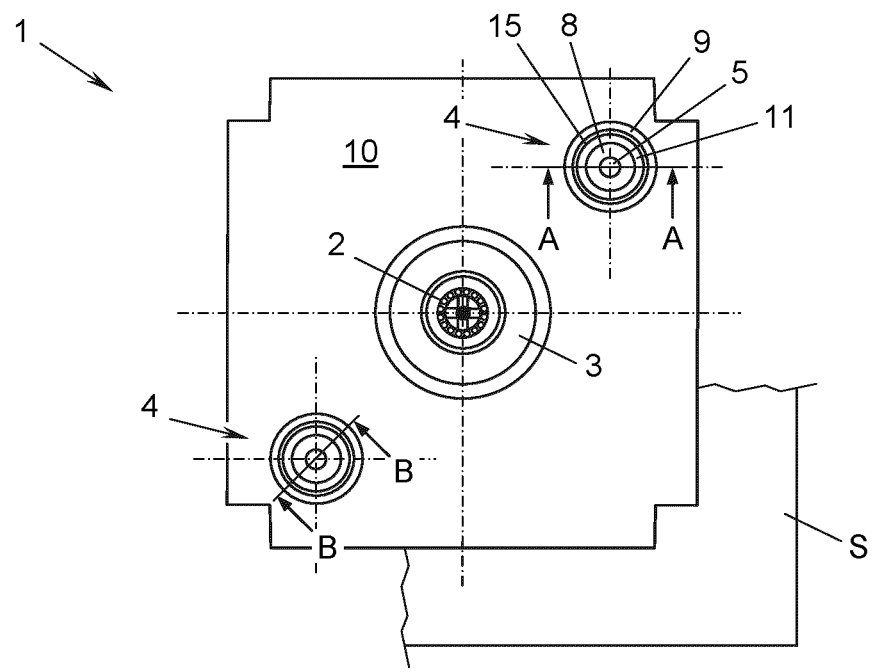
FIG. 1 shows an ion thruster with two neutralizers according to the present disclosed subject matter in a top view.

FIG. 1 shows an ion thruster 1 for propulsion of a spacecraft S, e.g., a satellite, only a part of which is shown. The ion thruster 1 comprises an ion emitter 2 for emitting ions of a propellant from a reservoir (not visible in FIG. 1) inside the ion thruster 1 and an extractor 3 facing the ion emitter 2 for extracting and accelerating the ions from the ion emitter 2.

The depicted ion thruster 1 is of field-emission electric propulsion (FEEP) type. Ion thrusters 1 of this type use liquid metal as propellant, e.g. Caesium, Indium, Gallium or Mercury, which is heated above the liquefaction temperature in the reservoir, fed from the reservoir towards the ion emitter 2 and ionized by field-emission. Alternatively, the ion thruster 1 can use gas, e.g. xenon, as propellant, which is ionized by extracting electrons from the atoms. In a further alternative, the ion thruster 1 may be of colloid type using ionic liquid, e.g., room temperature molten salts, as propellant. The extractor 3 extracts and accelerates the (here: positive) ions of the propellant by means of a strong electric field in the range from several hundred to several thousand volts, thereby generating thrust for propulsion of the spacecraft S.

The ion thruster 1 comprises one or more (in the example of FIG. 1: two) electron sources, also known in the art as "neutralizers", 4 to the sides of the ion emitter 2 for avoiding an unwanted charging of the ion thruster 1—and thus of the spacecraft S—due to emission of positively charged ions.

Figure 2:
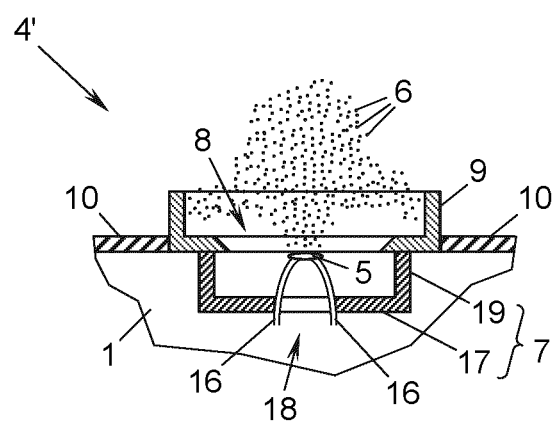
FIG. 2 shows a prior art neutralizer in detail in a fragmentary sectional view corresponding to a line A-A of FIG. 1.

FIG. 2 shows a neutralizer 4' according to prior art. The neutralizer 4' of FIG. 2 has a cathode 5 which, e.g., by thermionic emission, emits electrons 6 for compensating the emission of positively charged ions by the ion emitter 2 of the ion thruster 1. The neutralizer 4' further comprises a support 7 which is substantially cup-shaped and has an opening 8 on top. The cathode 5 is supported inside the opening 8 in a manner radially spaced from the support 7. Moreover, an electrically conducting shielding 9 which is electrically insulated from the support 7 surrounds said opening 8. The electrical insulation is achieved, e.g., by a gap or a dielectric between the support 7 and the shielding 9, or by a dielectric material the support 7 is optionally made of, as will be explained in greater detail further below.

The shielding 9—at least partially—shields the strong electric field applied to the ion emitter 2 by the extractor 3. For this purpose, the shielding 9 is typically connected to ground (electrical "zero potential") of the ion thruster 1, e.g., by attaching it to the grounded metallic top plate 10 of the ion thruster 1.

For directing the electrons 6 away from the cathode 5—and, thus, away from the spacecraft S—the cathode 5 is generally negatively charged with respect to ground of the ion thruster 1. However, a considerable number of electrons 6 emitted by the cathode 5 are continuously attracted and absorbed by the grounded shielding 9.

Figure 3:
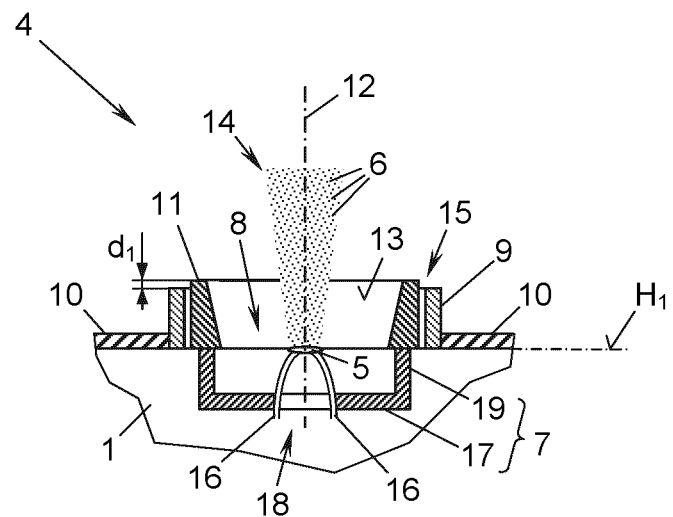
FIG. 3 shows a first embodiment of one of the neutralizers of FIG. 1 in detail in a fragmentary sectional view along the line A-A of FIG. 1.
Figure 4:
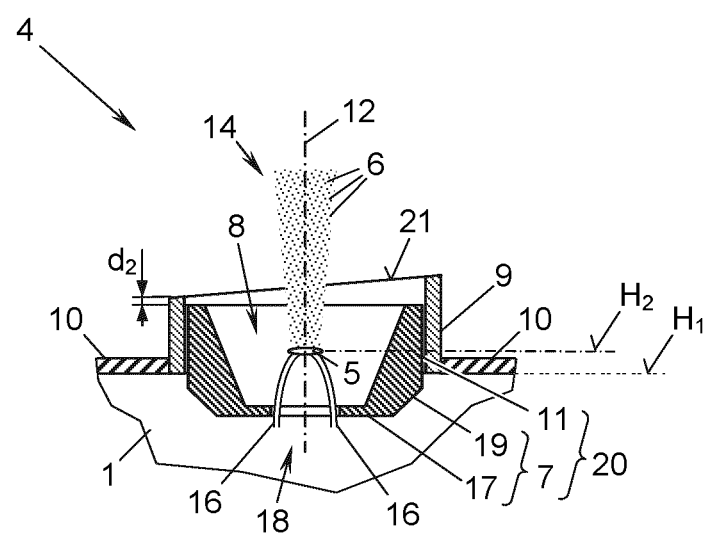
FIG. 4 shows a second embodiment of one of the neutralizers of FIG. 1 in detail in a fragmentary sectional view along the line B-B of FIG. 1.

With reference to FIGS. 3 and 4, the neutralizers 4 of FIG. 1 shall now be explained in greater detail. Similar components of the neutralizers 4 of FIGS. 3 and 4 and of the neutralizer 4' of FIG. 2 are designated with the same reference numerals.

Each neutralizer 4 of FIGS. 3 and 4 has an additional ring 11 which is mounted between the shielding 9 and the cathode 7. The ring 11 is electrically insulated from the shielding 9 and is radially spaced from the cathode 7 such that the electrons 6 pass through the ring 11 when emerging from the opening 8 of the neutralizer 4.

In the example of FIG. 3, the support 7, the shielding 9 and the ring 11 are symmetrical about a common central axis 12. Moreover, the cathode 5 is supported in a way that it is in the centre of the opening 8 of the support 7. It shall be noted that, in this context, the term "symmetrical" refers to a support 7, a shielding 9 and/or a ring 11, which is generally rotationally symmetrical about the central axis 12, e.g., has a regular polygonal cross-section, or is circularly symmetrical about the central axis 12, i.e., has an annular cross-section. Moreover, the support 7, the shielding 9 and the ring 11 do not necessarily share the same symmetry and/or do not even need to be symmetrical at all. Furthermore, the cathode 5 may be located other than centrally in the opening 8.

The cathode 5 is, e.g., a thermionic cathode 5, or may be of any other type known in the art. Moreover, in the optional embodiments of FIGS. 3 and 4, the cathode 5 is a disc- or wire-shaped plate which is optionally also symmetrical about the central axis 12.

In one embodiment, the ring 11 is both electrically conductive and electrically insulated from the shielding 9. In this case, the ring 11 may be negatively pre-charged by means of a respective controlled voltage supply (not shown). Alternatively, the electrically conductive ring 11 is electrically "floating", i.e., electrically insulated from any other component and without applying any voltage supply or control, such that it will accrue electrostatic charges by electrons 6 initially emitted by the cathode 5 and absorbed by the ring 11 until a respective electrostatic charging level of the ring 11 is reached.

In an alternative embodiment, the ring 11 is made of a dielectric material, particularly the ring 11 may be ceramic. In this case, some electrons 6 initially emitted from the cathode 5 attach to the inner face 13 of the ring 11 and thereby gradually establish an electrostatic charging on the inner face 13 without applying any voltage supply or control. In each of the aforementioned embodiments of the ring 11, an electric field resulting from the electrostatic charging of the ring 11 counteracts the electrostatic attraction of electrons 6 by the grounded shielding 9 such that further electrons 6 emitted by the cathode 5 are kept away from the ring 11 and, thus, from the shielding 9 and a beam 14 of electrons 6 may form.

In the example of FIG. 3, a gap 15 between the shielding 9 and the ring 11 ensures electrical insulation of the ring 11 from the shielding 9. When the ring 11 is dielectric, particularly ceramic, the gap 15 is not required as electrical insulation is achieved by the dielectric ring 11 itself. However, the gap 15 further increases the resilience and helps to avoid an electrically conductive path between the ring 11 and the shielding 9, e.g., due to some propellant eventually depositing on the surface of the ion thruster 1 during its lifetime. In the absence of the gap 15, the ring 11 may optionally be formed as an inner layer on the shielding 9 such that the shielding 9 and the ring 11 together form a single part having the shielding 9 as an electrically conductive outer layer and the ring 11 as a dielectric, particularly ceramic, inner layer.

In a further embodiment, the inner face 13 of the ring 11 widens in axial direction, i.e., in the direction of the central axis 12, with increasing distance from the support 7. Thereby, the inner face 13 of the ring 11 has a frustoconical shape which facilitates the forming of the beam 14 of electrons 6. However, different shapes of the ring 11 and its inner face 13 are feasible.

As depicted by a difference $d_1$ in the example of FIG. 3, the ring 11 optionally extends further from the support 7 in axial direction than the shielding 9. The further extending portion of the ring 11 may even radially project away from the central axis 12 and—at least partly—overlap the shielding 9 (not shown).

In the present example, also the support 7 is ceramic such that the shielding 9 (and/or the ring 11) may be affixed thereto. Some electrons 6 initially emitted by the cathode 5 attach to the surface of the ceramic support 7 and, thus, gradually establish an electrostatic charging resulting in an electrical field that counteracts an attraction of further electrons 6 by the initially uncharged or partially charged support 7. This supports the formation of the beam 14 of electrons 6. It is understood, however, that a similar effect can be achieved by a different dielectric material or, alternatively, by an electrically conductive support 7, as explained earlier with respect to the ring 11.

There are different ways of supporting the cathode 5 inside the opening 8 of the support 7, e.g., by means of brackets, clamps etc. as known in the art. In the present example, the cathode 5 has supply wires 16 for connecting to a respective power supply (not shown). Via these supply wires 16 the cathode 5 is mounted to the support 7, in the depicted embodiment, to a bottom plate 17 of the support 7. The bottom plate 17 optionally has one or more bores 18 and, together with a shell (here: an annular shell) 19, which extends from the bottom plate 17 to the opening 8, constitutes the support 7. It is understood that the bottom plate 17 and the shell 19 are either a single, unitary part or are assembled from two or more separate parts to form the support 7. Moreover, the bottom plate 17 is optional, such that the support 7 may have a shape other than cup-shape, e.g., the support 7 be annular, conical, frustoconical, or the like.

In the example of FIG. 4, the ring 11 and the support 7 are a single, unitary part 20, i.e., cannot be separated from each other without destruction. This unitary part 20 has a first portion, i.e., the support 7, supporting the cathode 5 and having the opening 8, and a second portion, i.e., the ring 11, between the shielding 9 and the cathode 5 which second portion is electrically insulated from the shielding 9 and radially spaced from the cathode 5. The part 20 may have a suitable shape, e.g., an annular, conical, frustoconical, cylindrical, or cup shape, or the like; it optionally has a-unitary-bottom plate 17 and shell 19.

Moreover, the shielding 9, in axial direction, extends further from the support 7 than the ring 11 as depicted by a difference $d_2$ in this example. Furthermore, the shielding 9 has an oblique top face 21, i.e., the shielding 9 extends further from the support 7 on one side of the opening 8 (here: on the side facing the ion emitter 2) than on the opposite side of the opening 8. Such an asymmetric shielding 9 supports compensation of an asymmetry in the strong electrical field around the neutralizer 4, particularly in the electrical field of the extractor 3 of the ion emitter 2. However, the oblique top face 21 is optional and independent of the total extension of the shielding 9 from the support 7, i.e., of a potential difference $d_2$. Moreover, an asymmetric electrical field around the neutralizer 4 may alternatively be compensated by an optional further shielding (not shown) which is also connected to ground of the ion thruster 1 and extends from the top plate 10 thereof, e.g., between the aforementioned shielding 9 and the extractor 3 of the ion emitter 2. To this end, the further shielding may at least partially surround and/or overlap the extractor 3 or said shielding 9.

For further supporting the directing and forming of the electron beam 14 emitted by the cathode 5, the cathode 5 may be supported at different heights inside the opening 8, e.g., at a height $H_2$ (FIG. 4) or at a lower height $H_1$ (FIG. 3).

Moreover, the neutralizer 4 may be arranged at different heights with respect to the top plate 10 of the ion thruster 1. Particularly, the neutralizer 4 may be arranged such that the top face 21 of the shielding 9 is flush with the top plate 10. In this case, the shielding 9 may be integrated into or unitary with the top plate 10.

The disclosed subject matter is not restricted to these specific embodiments described in detail herein but encompasses all variants, combinations—particularly combinations of embodiments described above with respect to FIGS. 3 and 4—and modifications thereof that fall within the frame of the appended claims.

What is claimed is:

1. A neutralizer for an ion thruster of a spacecraft, comprising: a cathode for emission of electrons,
a support with an opening inside which the cathode is supported by the support in a radially spaced manner, and
an electrically conductive shielding which surrounds said opening and is electrically insulated from the support,
wherein a ring is mounted between the electrically conductive shielding and the cathode and is electrically insulated from the electrically conductive shielding and radially spaced from the cathode, and
wherein the ring is entirely ceramic.

2. The neutralizer according to claim 1, wherein the ring is formed as an inner layer on the electrically conductive shielding.

3. The neutralizer according to claim 1, wherein the support, the electrically conductive shielding and the ring are symmetrical about a common central axis, and wherein the cathode is supported to be in a centre of said opening.

4. The neutralizer according to claim 1, wherein the ring has an inner face that, in an axial direction, widens with increasing distance from the support.

5. The neutralizer according to claim 1, wherein the electrically conductive shielding, in an axial direction, extends further from the support than the ring.

6. The neutralizer according to claim 1, wherein the support is ceramic.

7. A neutralizer for an ion thruster of a spacecraft comprising:
a cathode for emission of electrons,
a support with an opening inside which the cathode is supported by the support in a radially spaced manner, and
an electrically conductive shielding which surrounds said opening and is electrically insulated from the support,
wherein a ring is mounted between the shielding and the cathode and is electrically insulated from the shielding and radially spaced from the cathode,
wherein the ring is arranged to be held at or to adopt an electrostatic charging level which differs from an electrostatic charging level of the electrically conductive shielding in order to create an electrical field by which a number of electrons absorbed by the electrically conductive shielding is reduced, and
wherein the ring and the support are a single, unitary part.

8. The neutralizer according to claim 7, wherein the ring is electrically conductive.

9. A neutralizer for an ion thruster of a spacecraft, comprising:
a cathode for emission of electrons,
a support with an opening inside which the cathode is supported by the support in a radially spaced manner, and
an electrically conductive shielding which surrounds said opening and is electrically insulated from the support,
wherein a ring is mounted between the electrically conductive shielding and the cathode and is electrically insulated from the electrically conductive shielding and radially spaced from the cathode,
wherein the ring is arranged to be held at or to adopt an electrostatic charging level which differs from an electrostatic charging level of the electrically conductive shielding in order to create an electrical field by which a number of electrons absorbed by the electrically conductive shielding is reduced,
wherein the support and the ring are symmetrical about a common central axis, and wherein the electrically conductive shielding has an oblique top face such that, in an axial direction, the electrically conductive shielding extends further from the support on one side of said opening than on an other side of said opening wherein said other side is opposite to said one side.

10. The neutralizer according to claim 9, wherein the ring is electrically conductive.

11. The neutralizer according to claim 9, wherein the ring has an inner face that, in an axial direction, widens with increasing distance from the support.

12. The neutralizer according to claim 9, wherein the electrically conductive shielding, in an axial direction, extends further from the support than the ring.

13. The neutralizer according to claim 9, wherein the support is ceramic.

14. A neutralizer for an ion thruster of a spacecraft, comprising:
a cathode for emission of electrons,
a support with an opening inside which the cathode is supported by the support in a radially spaced manner, and
an electrically conductive shielding which surrounds said opening and is electrically insulated from the support,
wherein a ring is mounted between the electrically conductive shielding and the cathode and is electrically insulated from the electrically conductive shielding and radially spaced from the cathode, and
wherein the ring, in an axial direction, extends further from the support than the shielding.

15. The neutralizer according to claim 14, wherein the ring is electrically conductive.

16. The neutralizer according to claim 14, wherein the ring has an inner face that, in an axial direction, widens with increasing distance from the support.

17. The neutralizer according to claim 14, wherein the support, the electrically conductive shielding and the ring are symmetrical about a common central axis, and wherein the cathode is supported to be in a centre of said opening.

18. A neutralizer for an ion thruster of a spacecraft, comprising:
a cathode for emission of electrons,
a support with an opening inside which the cathode is supported by the support in a radially spaced manner, and
an electrically conductive shielding which surrounds said opening and is electrically insulated from the support,
wherein a ring is mounted between the electrically conductive shielding and the cathode and is electrically insulated from the electrically conductive shielding and radially spaced from the cathode,
wherein the ring is arranged to be held at or to adopt an electrostatic charging level which differs from an electrostatic charging level of the electrically conductive shielding in order to create an electrical field by which a number of electrons absorbed by the electrically conductive shielding is reduced,
wherein the cathode has supply wires via which the cathode is mounted to the support.

19. The neutralizer according to claim 18, wherein the ring is electrically conductive.

20. The neutralizer according to claim 18, wherein the ring has an inner face that, in an axial direction, widens with increasing distance from the support.

\* \* \* \* \*